(12) United States Patent
Igarashi et al.

(10) Patent No.: US 6,836,464 B2
(45) Date of Patent: Dec. 28, 2004

(54) PNNI ROUTING COMPUTATION SYSTEM IN ATM EXCHANGE

(75) Inventors: Mitsuru Igarashi, Tokyo (JP); Kazusa Murata, Tokyo (JP)

(73) Assignee: NEC Corporation, Tokyo (JP)

( * ) Notice: Subject to any disclaimer, the term of this patent is extended or adjusted under 35 U.S.C. 154(b) by 834 days.

(21) Appl. No.: 09/803,903

(22) Filed: Mar. 13, 2001

(65) Prior Publication Data

US 2001/0021184 A1 Sep. 13, 2001

(30) Foreign Application Priority Data

Mar. 13, 2000 (JP) ........................................ 2000-067983

(51) Int. Cl.[7] ............................ H04L 12/28; G01R 31/08
(52) U.S. Cl. ................................... 370/238; 370/395.31
(58) Field of Search ............................. 370/238, 238.1, 370/351, 395.1, 395.21, 395.31, 395.32, 255, 248, 400

(56) References Cited

U.S. PATENT DOCUMENTS

| 5,933,425 | A | * | 8/1999 | Iwata ........................... 370/351 |
| 6,094,687 | A | * | 7/2000 | Drake et al. ................. 709/241 |
| 6,256,309 | B1 | * | 7/2001 | Daley et al. ............. 370/395.43 |
| 6,529,498 | B1 | * | 3/2003 | Cheng ........................ 370/351 |
| 6,600,724 | B1 | * | 7/2003 | Cheng ........................ 370/256 |
| 6,606,303 | B1 | * | 8/2003 | Hassel et al. ............... 370/238 |
| 6,687,230 | B1 | * | 2/2004 | Furutono et al. ........... 370/238 |
| 6,717,920 | B1 | * | 4/2004 | Cheng ........................ 370/255 |

FOREIGN PATENT DOCUMENTS

| JP | 05-292109 | 11/1993 |
| JP | A 8-191308 | 7/1996 |
| JP | 10-164074 | 6/1998 |
| JP | A 10-257060 | 9/1998 |
| JP | A 11-163890 | 6/1999 |
| JP | 11-163890 | 6/1999 |
| JP | A 2001-217839 | 8/2001 |

* cited by examiner

Primary Examiner—Wellington Chin
Assistant Examiner—Brenda Pham
(74) Attorney, Agent, or Firm—Young & Thompson (57) ABSTRACT

In a PNNI routing computation system, each ATM exchange stores a plural types of weight values for computing route for each link and stores a type which a subscriber uses for routing. When PNNI routing is determined in response to call request of a subscriber, the exchange firstly selects possible routes from a call sending node to a call receiving node. Then the exchange determines which type of weight value the subscriber uses for routing by searching a storage in the exchange. Then, the exchange determines one route which total value of the weight values of links along the route is the minimum among the selected routes.

28 Claims, 5 Drawing Sheets

PNNI ROUTING COMPUTATION SYSTEM IN ATM EXCHANGE

BACKGROUND OF THE INVENTION

1. Field of the Invention

The invention relates to an ATM exchange and, in particular, to a PNNI routing computation system applied to the ATM exchange.

2. Description of the Related Art

Generally, in an ATM exchange, PNNI (Private Network-Network Interface) routing computation is performed before receiving of a call and the computation results are stored as pre-computed routes. Therefore, the computation can realize a rapid process of the ATM exchange.

For example, when the ATM exchange receives a call, if a proper route satisfying a QoS requirement of the call is found among the pre-computed routes, the proper route is used to establish a connection route of the call. Otherwise, a proper route is further determined by performing additional routing computation.

Also, in the PNNI routing computation, a route in a network is decided by using a sort of routing protocol (logic) which is incorporated into the ATM exchange in advance.

Therefore, when calls to be sent to the same destination are received in the same ATM exchange, the calls are sent via the same route. That is, it is difficult to select a route among a plurality of candidate routes according to an object of the call.

For example, a certain subscriber might require a network administrator to use a route which realizes the minimum CTD (Cell Transfer Delay) with regard to a response delay. On the other hand, another subscriber might require the network administrator to use a reliable route or to select a route which passes through ATM exchanges and which has a high reliability. At any rate, it is desirable to individually select a proper route which is fit for a purpose of the subscriber.

However, to select the proper routes, the network administrator must produce a connection by directly designating ATM exchanges and links which are included in the connection, and thus huge operating load and cost are imposed on the network administrator.

SUMMARY OF THE INVENTION

It is, therefore, an object of the invention to provide a PNNI routing computation system which can select, at an ATM exchange, a single route from a plurality of routes for calls which are received in the ATM exchange.

In other words, it is an object of the invention to provide a PNNI routing computation system which can establish a connection route satisfying a variety of subscriber's requirements of network.

According to a first aspect of the invention, there is provided a PNNI routing computation system which is used in a PNNI network including a plurality of ATM exchanges connected each other via links, and which performs PNNI routing computation on establishing a connection between subscribers. Herein, each ATM exchange comprises a storage unit which stores the plural types of weight values for each link, a computing unit which computes total weight value for each possible PNNI route between the subscribers by referring to one of the types of weight values selected by a calling subscriber, and a selecting unit which selects a route having the minimum total weight value among the possible PNNI routes as a result of the PNNI routing computation.

According to a second aspect of the invention, there is provided a PNNI routing computation system which is used in a PNNI network including a plurality of ATM exchanges connected each other via links, and which performs PNNI routing computation on establishing a connection between subscribers. Herein, each ATM exchange comprises a storage unit which stores the plural types of weight values for each link, a computing unit which computes total weight value for each possible PNNI route between the subscribers by referring to one of the types of weight values selected by a calling subscriber, and a selecting unit which selects a route having the minimum total weight value among the possible PNNI routes as a result of the PNNI routing computation, wherein the types of the weight values include a type of weight values based on administrative weight (AW) and a type of weight values based on cell transfer delay (CTD).

According to a third aspect of the invention, there is provided a PNNI routing computation system which is used in a PNNI network including a plurality of ATM exchanges connected each other via links, and which performs PNNI routing computation on establishing a connection between subscribers. Herein, each ATM exchange comprises a first storage unit which stores plural types of weight values for each link, the plural types of weight values being provided by a subscriber accommodated in the ATM exchange, a network information process unit which exchanges the plural types of weight values to the next ATM exchanges to obtain the plural types of weight values for all links of the PNNI network and stores the weight values obtained from the next ATM exchanges into the first storage unit, a computing unit which computes total weight values for all possible PNNI routes from the ATM exchange to one of the other ATM exchanges by referring to the plural types of weight values stored in the first storage unit, and a second storage unit which stores the computed total weight values for each PNNI route.

According to a fourth aspect of the invention, there is provided a PNNI routing computation system which is used in a PNNI network including a plurality of ATM exchanges connected each other via links, and which performs PNNI routing computation on establishing a connection between subscribers. Herein, each ATM exchange comprises a first storage unit which stores plural types of weight values for each link and a type of the weight values used for routing computation, the plural types of weight values and the type used for routing computation being provided by a subscriber accommodated in the ATM exchange, a network information process unit which exchanges the plural types of weight values to the next ATM exchanges to obtain the plural types of weight values for all links of the PNNI network and stores the weight values obtained from the next ATM exchanges into the first storage unit, a computing unit which computes total weight value for all possible PNNI routes from the ATM exchange to one of the other ATM exchanges by referring to the plural types of weight values stored in the first storage unit, a second storage unit which stores the computed total weight values for each PNNI route, and a first call process unit which, when a subscriber accommodated in an ATM exchange including the first call process unit issues a call request, selects a PNNI route having the minimum total weight value from the second storage unit based on the type of weight values provided by the calling subscriber.

According to a fifth aspect of the invention, there is provided a method of a PNNI routing computation on establishing a connection between subscribers in ATM exchanges which are included in a PNNI network and are connected each other via links. The method comprises the steps of computing total weight value for each possible PNNI route between the subscribers by referring to one of types of weight values selected by a calling subscriber, (each of the weight values corresponding to the link), and selecting a route having the minimum total weight value among the possible PNNI routes.

According to a sixth aspect of the invention, there is provided a method of a PNNI routing computation on establishing a connection between subscribers in ATM exchanges which are included in a PNNI network and are connected each other via links. The method comprises the steps of exchanging plural types of weight values each of which corresponds to a link and which are provided in a subscriber accommodated in the ATM exchange, to the next ATM exchanges to obtain the plural types of weight values for all links of the PNNI network, computing total weight values for all possible PNNI routes from the ATM exchange to one of the other ATM exchanges by referring to the obtained plural types of weight values, and storing the computed total weight values for each PNNI route.

According to a seventh aspect of the invention, there is provided a recording medium readable by a computer, tangibly embodying a program of instructions executable by the computer to perform a method of a PNNI routing computation on establishing a connection between subscribers in ATM exchanges which are included in a PNNI network and are connected each other via links. The method comprises the steps of computing total weight value for each possible PNNI route between the subscribers by referring to one of types of weight values selected by a calling subscriber, (each of the weight values corresponding to the link), and selecting a route having the minimum total weight value among the possible PNNI routes.

According to an eighth aspect of the invention, there is provided a computer data signal embodied in a carrier wave and representing a sequence of instructions which, when executed by a processor, cause the processor to perform a method of a PNNI routing computation on establishing a connection between subscribers in ATM exchanges which are included in a PNNI network and are connected each other via links. The method comprises the steps of computing total weight value for each possible PNNI route between the subscribers by referring to one of types of weight values selected by a calling subscriber, (each of the weight values corresponding to the link), and selecting a route having the minimum total weight value among the possible PNNI routes.

According to a ninth aspect of the invention, there is provided a program Product comprising, computer readable instructions and a recording medium bearing the computer readable instructions. And the instructions are adaptable to enable a computer to perform a method of a PNNI routing computation on establishing a connection between subscribers in ATM exchanges which are included in a PNNI network and are connected each other via links. The method comprises the steps of computing total weight value for each possible PNNI route between the subscribers by referring to one of types of weight values selected by a calling subscriber, (each of the weight values corresponding to the link), and selecting a route having the minimum total weight value among the possible PNNI routes.

According to a tenth aspect of the invention, there is provided a recording medium readable by a computer, tangibly embodying a program of instructions executable by the computer to perform a method of a PNNI routing computation on establishing a connection between subscribers in ATM exchanges which are included in a PNNI network and are connected each other via links. The method comprises the steps of exchanging plural types of weight values each of which corresponds to a link and which are provided in a subscriber accommodated in the ATM exchange, to the next ATM exchanges to obtain the plural types of weight values for all links of the PNNI network, computing total weight values for all possible PNNI routes from the ATM exchange to one of the other ATM exchanges by referring to the obtained plural types of weight values, and storing the computed total weight values for each PNNI route.

According to an eleventh aspect of the invention, there is provided a computer data signal embodied in a carrier wave and representing a sequence of instructions which, when executed by a processor, cause the processor to perform a method of a PNNI routing computation on establishing a connection between subscribers in ATM exchanges which are included in a PNNI network and are connected each other via links. The method comprises the steps of exchanging plural types of weight values each of which corresponds to a link and which are provided in a subscriber accommodated in the ATM exchange, to the next ATM exchanges to obtain the plural types of weight values for all links of the PNNI network, computing total weight values for all possible PNNI routes from the ATM exchange to one of the other ATM exchanges by referring to the obtained plural types of weight values, and storing the computed total weight values for each PNNI route.

According to a twelfth aspect of the invention, there is provided a Program comprising, computer readable instructions and a recording medium bearing the computer readable instructions. And the instructions are adaptable to enable a computer to perform a method of a PNNI routing computation on establishing a connection between subscribers in ATM exchanges which are included in a PNNI network and are connected each other via links. The method comprises the steps of exchanging plural types of weight values each of which corresponds to a link and which are provided in a subscriber accommodated in the ATM exchange, to the next ATM exchanges to obtain the plural types of weight values for all links of the PNNI network, computing total weight values for all possible PNNI routes from the ATM exchange to one of the other ATM exchanges by referring to the obtained plural types of weight values, and storing the computed total weight values for each PNNI route.

According to a thirteenth aspect of the invention, there is provided a routing computation system which is used in an IP network including a plurality of routing devices connected to each other via links, and which performs a routing computation on establishing a connection between subscribers. Herein, each routing device comprises a storage unit which stores plural types of weight values for each link, a computing unit which computes total weight value for each possible route between the subscribers by referring to one of the types of weight values selected by a calling subscriber, and a selecting unit which selects a route having the minimum total weight value among the possible PNNI routes as a result of the routing computation.

According to a fourteenth aspect of the invention, there is provided a routing computation system which is used in an IP network including a plurality of routing devices connected each other via links, and which performs a routing computation on establishing a connection between subscribers. Herein, each routing device comprises a storage unit which stores the plural types of weight values for each link, a computing unit which computes total weight value for each possible route between the subscribers by referring to one of the types of weight values selected by a calling subscriber, and a selecting unit which selects a route having the minimum total weight value among the possible PNNI routes as a result of the routing computation, wherein the types of the weight values include a type of weight values based on administrative weight (AW) and a type of weight values based on cell transfer delay (CTD).

According to a fifteenth aspect of the invention, there is provided a routing computation system which is used in an IP network including a plurality of routing devices connected each other via links, and which performs a routing computation on establishing a connection between subscribers. Herein, each routing device comprises a first storage unit which stores plural types of weight values for each link, the plural types of weight values being provided by a subscriber accommodated in the routing device, a network information process unit which exchanges the plural types of weight values to the next routing devices to obtain the plurality types of weight values for all links of the IP network and stores the weight values obtained from the next routing devices into the first storage unit, a computing unit which computes total weight values for all possible routes from the routing device to one of the other routing devices by referring to the plural types of weight values stored in the first storage unit, and a second storage unit which stores the computed total weight values for each route.

According to a sixteenth aspect of the invention, there is provided a routing computation system which is used in an IP network including a plurality of routing devices connected to each other via links, and which performs a routing computation on establishing a connection between subscribers. Herein, each routing device comprises a first storage unit which stores plural types of weight values for each link and a type of the weight values used for routing computation, the plural types of weight values and the type used for routing computation being provided by a subscriber accommodated in the routing device, a network information process unit which exchanges the plural types of weight values to the next routing devices to obtain the plural types of weight values for all links of the IP network and stores the weight values obtained from the next routing devices into the first storage unit, a computing unit which computes total weight value for all possible routes from the routing device to one of the other routing devices by referring to the plural types of weight values stored in the first storage unit, a second storage unit which stores the computed total weight values for each route, and a first call process unit which, when a subscriber accommodated in a routing device including the first call process unit issues a call request, selects a route having the minimum total weight value from the second storage unit based on the type of weight values provided by the calling subscriber.

According to a seventeenth aspect of the invention, there is provided a method of an IP routing computation on establishing a connection between subscribers in routing devices which are included in an IP network and are connected each other via links. The method comprises the steps of computing total weight value for each possible route between the subscribers by referring to one of types of weight values selected by a calling subscriber, each of the weight values corresponding to the link, and selecting a route having the minimum total weight value among the possible routes.

According to an eighteenth aspect of the invention, there is provided a method of an IP routing computation on establishing a connection between subscribers in routing devices which are included in an IP network and are connected each other via links. The method comprises the steps of exchanging plural types of weight values each of which corresponds to a link and which are provided in a subscriber accommodated in the routing device, to the next routing devices to obtain the plural types of weight values for all links of the IP network, computing total weight values for all possible routes from the routing device to one of the other routing devices by referring to the obtained plural types of weight values, and storing the computed total weight values for each route.

According to a nineteenth aspect of the invention, there is provided a computer data signal embodied in a carrier wave and representing a sequence of instructions which, when executed by a processor, cause the processor to perform a method of an IP routing computation on establishing a connection between subscribers in routing devices which are included in an IP network and are connected each other via links. The method comprises the steps of exchanging plural types of weight values each of which corresponds to a link and which are provided in a subscriber accommodated in the routing device, to the next routing devices to obtain the plural types of weight values for all links of the IP network, computing total weight values for all possible routes from the routing device to one of the other routing device by referring to the obtained plural types of weight values, and storing the computed total weight values for each route.

According to a twentieth aspect of the invention, there is provided a program Product comprising, computer readable instructions and a recording medium bearing the computer readable instructions. And the instructions are adaptable to enable a computer to perform a method of an IP routing computation on establishing a connection between subscribers in routing devices which are included in an IP network and are connected each other via links. The method comprises the steps of exchanging plural types of weight values each of which corresponds to a link and which are provided in a subscriber accommodated in the routing device, to the next routing devices to obtain the plural types of weight values for all links of the IP network, computing total weight values for all possible routes from the routing device to one of the other routing devices by referring to the obtained plural types of weight values, and storing the computed total weight values for each route.

DESCRIPTION OF THE PREFERRED EMBODIMENT

Figure 1:
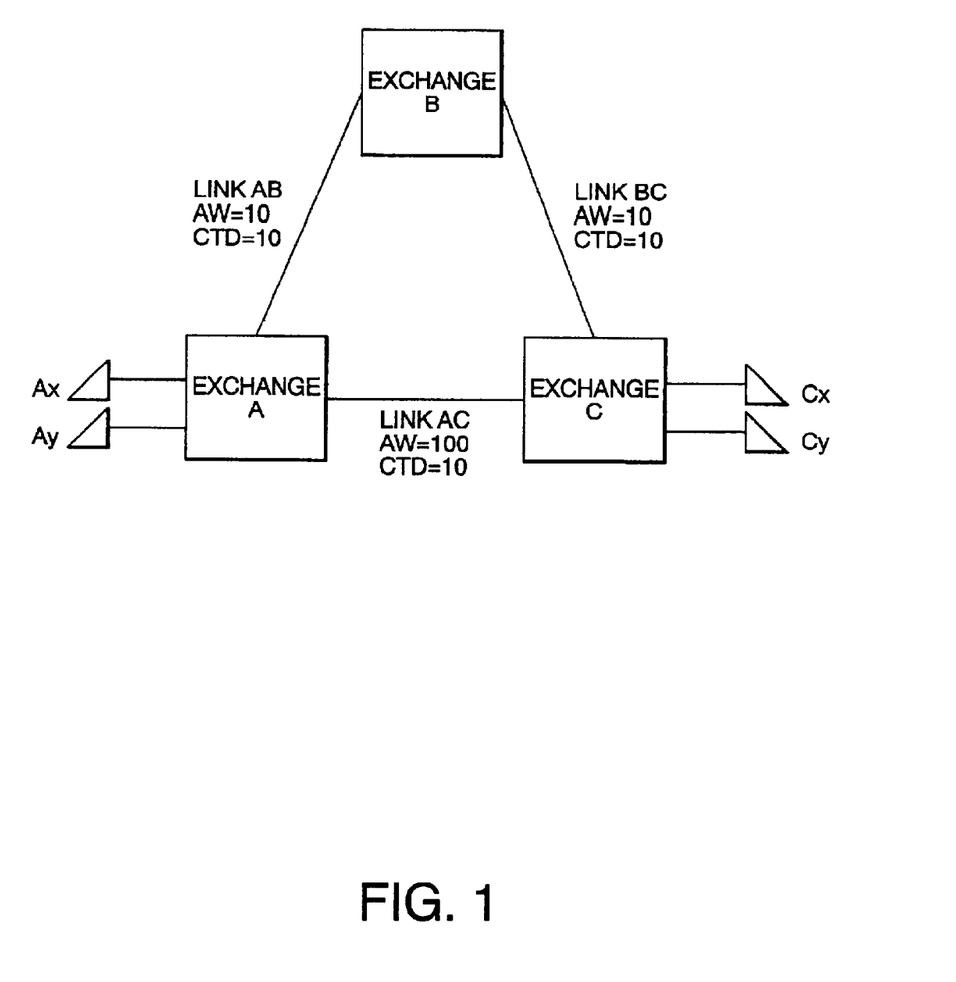
FIG. 1 shows a block diagram of an embodiment of an ATM exchange system to which a PNNI routing computation system of the invention is applied.

In FIG. 1, an ATM network is shown which the PNNI routing computation system of the invention is applied to.

The ATM network includes ATM exchanges A, B, and C. As shown in FIG. 1, the ATM exchange A is connected to the exchange B via a link AB. The ATM exchange B is connected to the exchange C via a link BC. And the ATM exchange C is connected to the exchange A via a link AC.

Each of the links AB, BC, and AC can have two types of weight values L1 (AW) and L2 (CTD) which are used for routing (computation of a route). These weight values are held in the ATM exchanges A, B, and C and are used in computation of routing of a connection. Also, the ATM exchange A accommodates subscribers Ax and Ay, and the ATM exchange C accommodates subscribers Cx and Cy.

Then, when a connection between subscribers is established (herein, it is assumed that the network subscribers Ax and Ay perform call request), the network subscribers Ax and Ay send one of the weight values L1 and L2 to the ATM exchange A. When the ATM exchange A receives the weight value, the ATM exchange A computes and determines a connection route having the minimum total weight value along the route by using the received weight value.

For example, when the network subscriber Ax selects the weight value L1 and performs call request, the ATM exchange A selects a route which is composed of the link AB, the ATM exchange B, the link BC, and the ATM exchange C. On the other hand, when the network subscriber Ay selects the weight value L2 and performs call request, the ATM exchange A selects a route which is composed of the link AC and the ATM exchange C.

In FIG. 1, the weight values L1 (AW) and L2 (CTD) are shown, but n (n is a natural number which is greater than two) types of weight values can be used according to variation of requirements of the subscribers. As a result, various route patterns can be selected.

Figure 2:
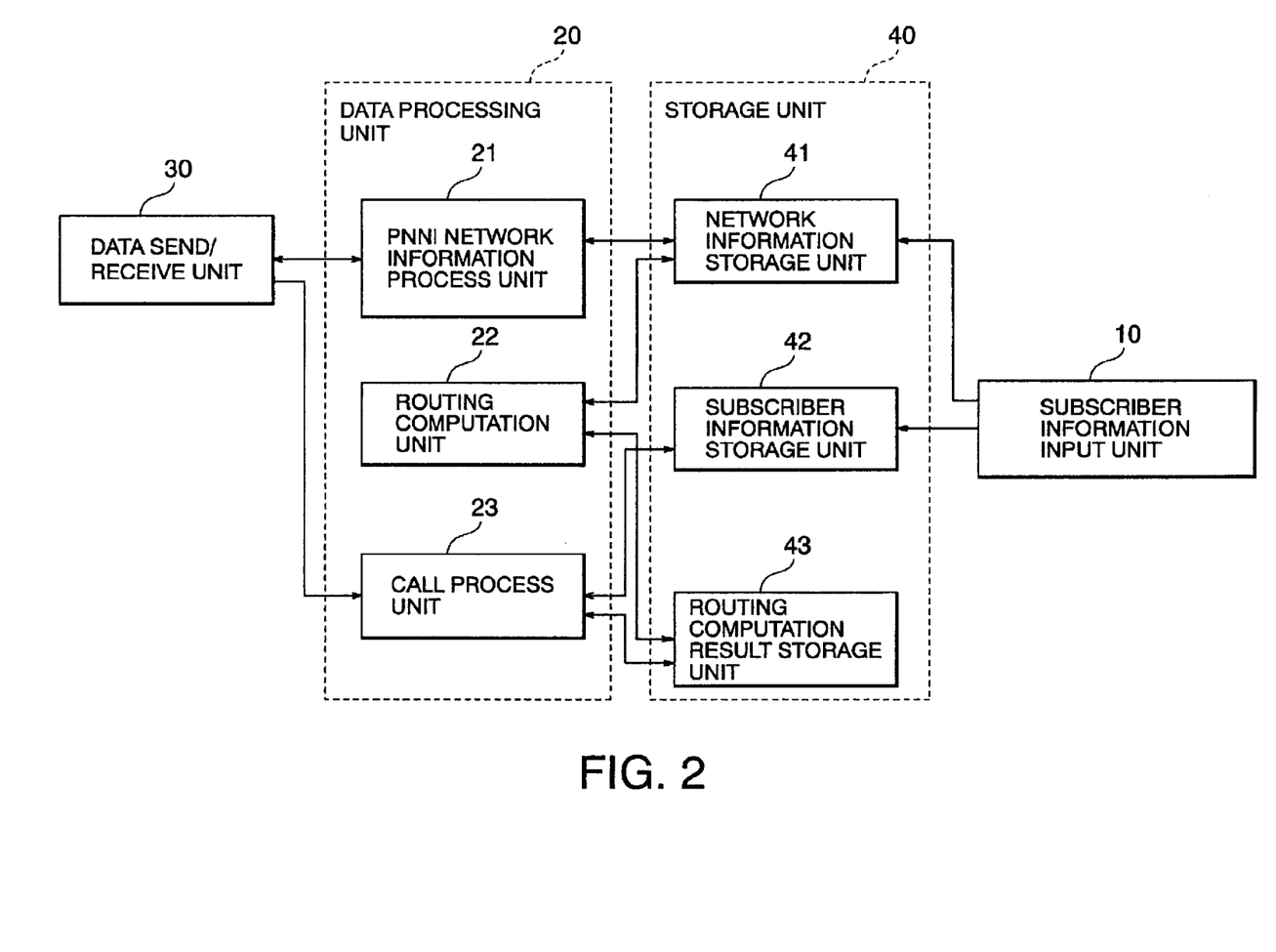
FIG. 2 shows a block diagram of an embodiment of the PNNI routing computation system according to the invention.

Next, description is made about elements included in the ATM exchanges A to C which the PNNI routing computation system is applied to, with reference to FIG. 2. Each ATM exchange includes a subscriber information input unit 10 which registers subscriber information, a data processing unit 20 which is controlled by a program, a data send/receive unit 30 which sends or receives information between the ATM exchange and other ATM exchanges which are connected to the ATM exchange, and a storage unit 40 which stores information related to a network and the subscribers.

Specifically, the data processing unit 20 includes a PNNI network information process unit 21 which processes the information which is received by the data send/receive unit 30, a routing computation unit 22 which computes a connection route, and a call process unit 23 which computes for establishment of the connection route.

The storage unit 40 includes a network information storage unit 41 which stores some types of weight values which are assigned to each network link or each service provided to subscribers, a subscriber information storage unit 42 which stores a type of weight value for each subscriber, as subscriber information, and a routing computation result storage unit 43 which stores routes which are computed by the routing computation unit 22.

Also, the type of weight value represents a group of weight values which are used for routing (computing a route).

The subscriber information input unit 10 receives subscriber information from a subscriber, and registers the information into the subscriber information storage unit 42.

The data send/receive unit 30 receives information from another ATM exchange which is connected to the illustrated ATM exchange including the data send/receive unit 30, and sends the information to the PNNI network information process unit 21. When the data send/receive unit 30 receives a connection establishment request (a call request) from the subscriber, the unit 30 also sends the request to the call process unit 23.

When the PNNI network information process unit 21 processes the received information, the unit 21 registers the processing results to the network information storage unit 41. The unit 41 stores network structure (namely, network topology), and weight values which are used to select a route and are assigned to the corresponding network link.

The routing computation unit 22 reads information from the network information storage unit 41 and computes a connection route using the information. And then the unit 22 registers the computation results to the routing computation result storage unit 43.

Figure 3:
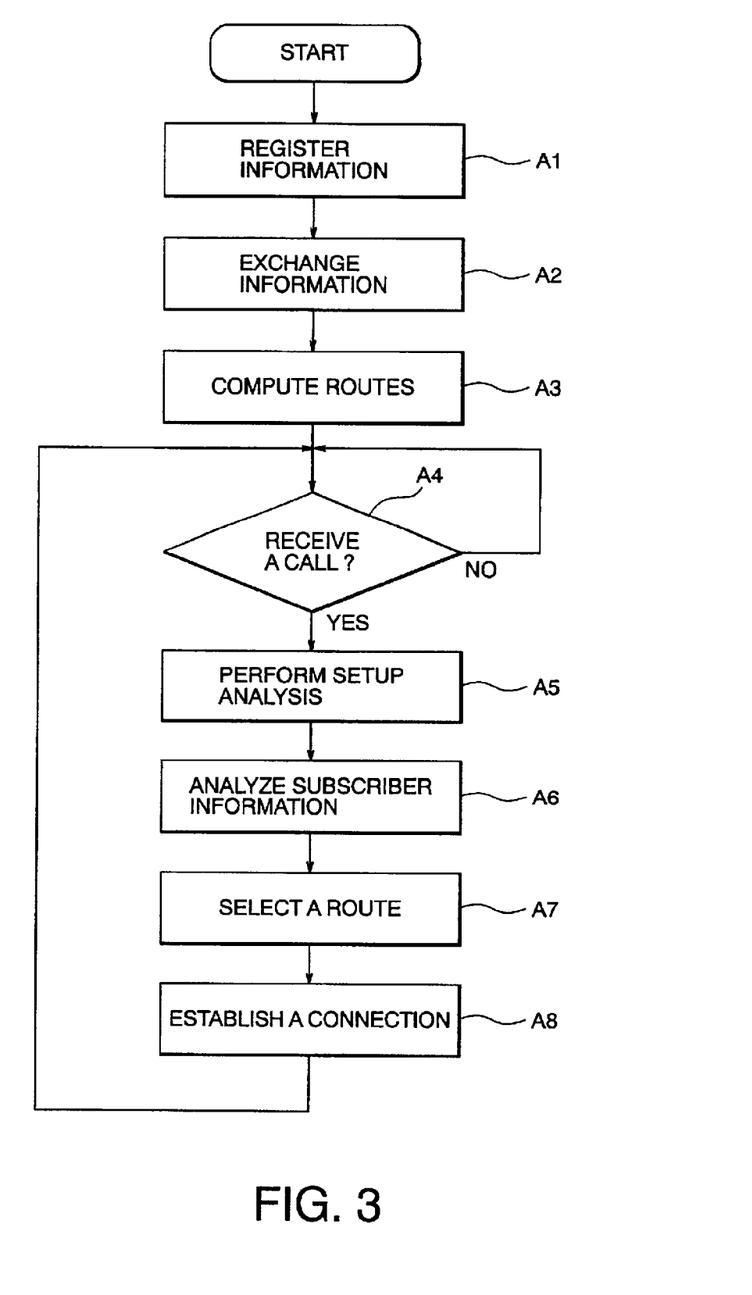
FIG. 3 shows a flowchart for use in describing operations of the PNNI routing computation system shown in FIG. 2.

Next, description is made about an embodiment of PNNI routing computation system according to the invention with reference to FIG. 3.

At first, a subscriber registers his/her own subscriber information to the subscriber information storage unit 42 of the storage unit 40, and registers weight values for a network link to the subscriber information storage unit 42 (step A1).

Then, the PNNI network information process unit 21 exchanges link information in a network to the next ATM exchange using the data send/receive unit 30. And the unit 21 registers the link information on the whole network links in the network to the network information storage unit 41 in the storage unit 40 (step A2).

The routing computation unit 22 computes possible routes for all exchanges in the network and determines total weight value for each route by summing up weight values each of which corresponds to a link of a route. And then the unit 22 sends the total weight values to the network information storage unit 41 in the storage unit 40 (step A3).

Next, the data send/receive unit 30 checks whether or not a connection establishment request from a subscriber is received. If the connection establishment request is received, the data send/receive unit 30 sends the above-mentioned request to the call process unit 23 in the data processing unit 20 (step A4).

The call process unit 23 analyzes the connection establishment request and specifies a subscriber who issues the request, that is, the unit 23 performs setup analysis (step A5). Thereafter, the unit 23 reads a type of weight value which is designated by the subscriber from the subscriber information storage unit (step A6).

Furthermore, the unit 23 gets a plurality of routes between a source ATM exchange and a destination ATM exchange of the call from the routing computation result storage unit 43, and selects a desirable route using the weight values belonging to the type obtained by step A6 (step A7). Then, the unit 23 establishes a connection route of the call based on the selected route (step A8).

Referring to FIG. 1 again, a subscriber of an ATM exchange sets, for each link, a weight value AW (Administrative Weight) which is used for normal PNNI routing and CTD (Cell Transfer Delay) which represents a transfer delay of a cell, and registers these values by using the subscriber information input unit 10 shown in FIG. 2.

As described above, a type of weight values other than AW and CTD may be used and the subscriber can sets each the type of weight values for each link at each ATM exchange. Further, the subscriber can set the weight values using a single terminal connected to each ATM exchange.

Therefore, plural types of weight values are set for each link and each of weight values belonging to one type corresponds to one link. When the type is designated to use for PNNI routing, each of the weight values belonging to the designated type is used to represent a weight of the corresponding link.

Now, also referring to FIG. 3, a subscriber designates which one of AW or CTD should be used to select a route as routing information. And the routing information is registered by the subscriber information input unit 10 shown in FIG. 2 (step A1). If the information is registered about the ATM exchange A, AW and CTD are registered about each of links AB and AC which are connected to the ATM exchange. For example, as shown in FIG. 1, for link AB, AW is 10 and CTD is 10, and for link AC, AW is 100 and CTD is 10. And the subscriber Ax designates type AW as a type of weight values (that is, uses AW to select a route), and the subscriber Ay designates the CTD as a type of weight values.

Similar designation is carried out for the ATM exchanges B and C, although description has been restricted to the exchange A.

Next, a PNNI network information process unit 21 of the ATM exchange A informs the next ATM exchanges (B and C) via a data send/receive unit 30 of the existence of the weight values AW and CTD of the links AB and AC. In this event, the existence of the network subscribers Ax and Ay is also transmitted from the ATM exchange A to the next ATM exchanges. The other ATM exchanges (B and C) receive the information via the data send/receive unit 30 and register the received information to a network information storage unit 41 of each ATM exchange (step A2).

Next, the routing computation unit 22 determines routes each of which is connected to each ATM exchange using network information stored in the network information storage unit 41 and determines total AW value or total CTD value for each route (step A3). Herein, considering about a route from the ATM exchange A to the ATM exchange C, two routes, a route #1 (A→B→C) and a route #2 (A→C) can be determined. In the route #1, total CTD is 20 and total AW is 20. On the other hand, in the route #2, total CTD is 10 and total AW is 100. The information is then stored in the network information storage unit 41.

Then, description is made about operations executed when SVC (Switched Virtual Connection) is produced between the network subscribers Ax and Cx.

When the subscriber Ax sends a call message to the ATM exchange A, the data send/receive unit 30 of the ATM exchange A receives the call message (step A4). The call process unit 23 analyzes the call message and specifies that the network subscriber who sends the call message is the subscriber Ax and that an ATM exchange called by the call message is the ATM exchange C (step A5).

Next, the call process unit 23 specifies, using information stored in the subscriber information storage unit 42, that a type of weight value of the subscriber Ax for routing is AW (step A6). And then the unit 23 searches the routing computation result storage unit 43 for a route having the minimum total AW value and, as a result, selects a route (A→B→C, total AW value of 20) is selected (step A7). The unit 23 performs the call request in accordance with the normal PNNI call process based on the selected route (step A8).

On the other hand, when the network subscriber Ay issues a call request to a subscriber Cy accommodated in the ATM exchange C, a route (A→C, total CTD value of 10 and total AW value of 100) can be selected. Also, description about operations to select the route is omitted since the operations are the same as the above-described operations about selection of the route regarding to the subscriber Ax.

Figure 4:
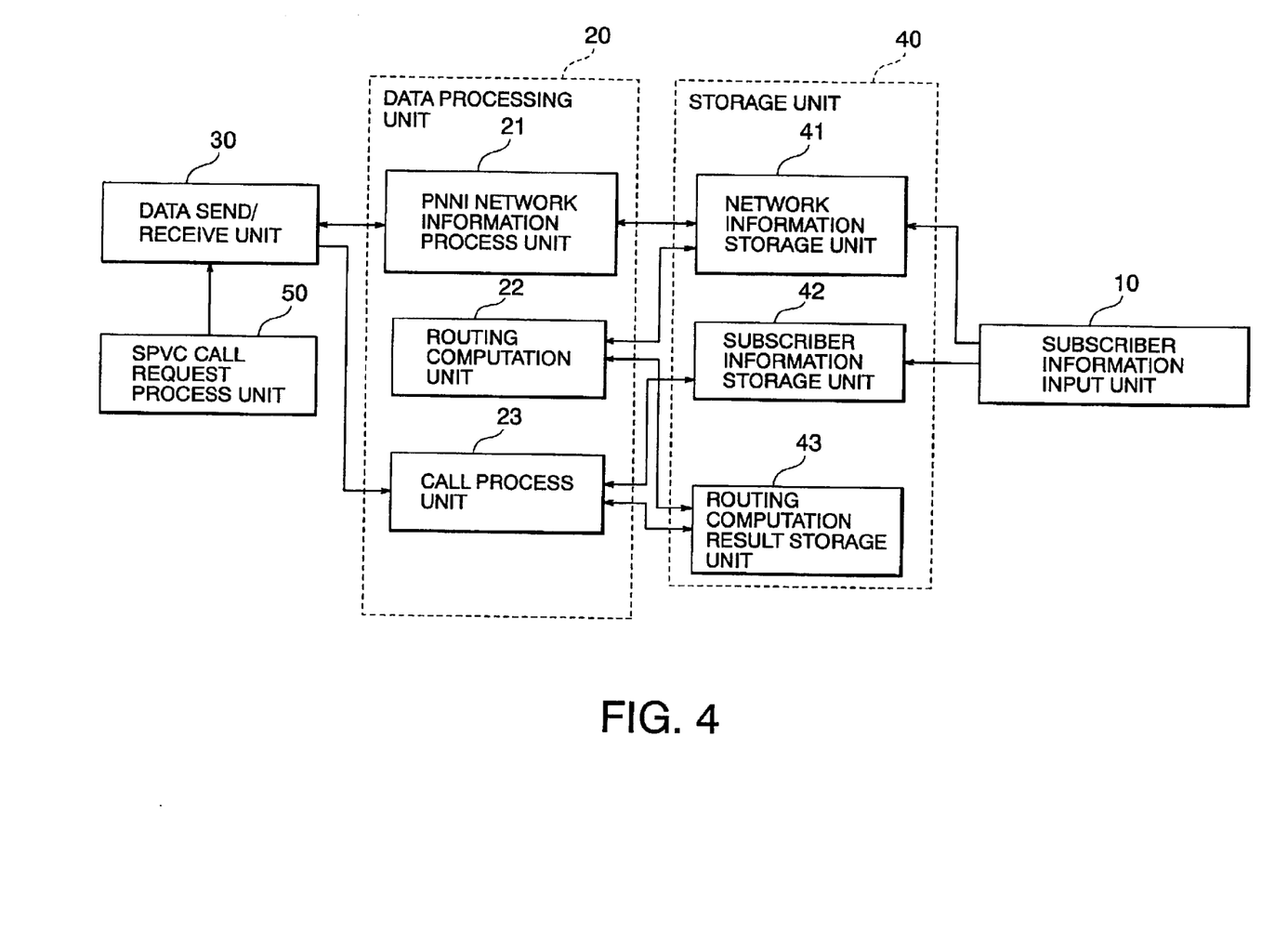
FIG. 4 shows a block diagram of another embodiment of the PNNI routing computation system according to the invention.
Figure 5:
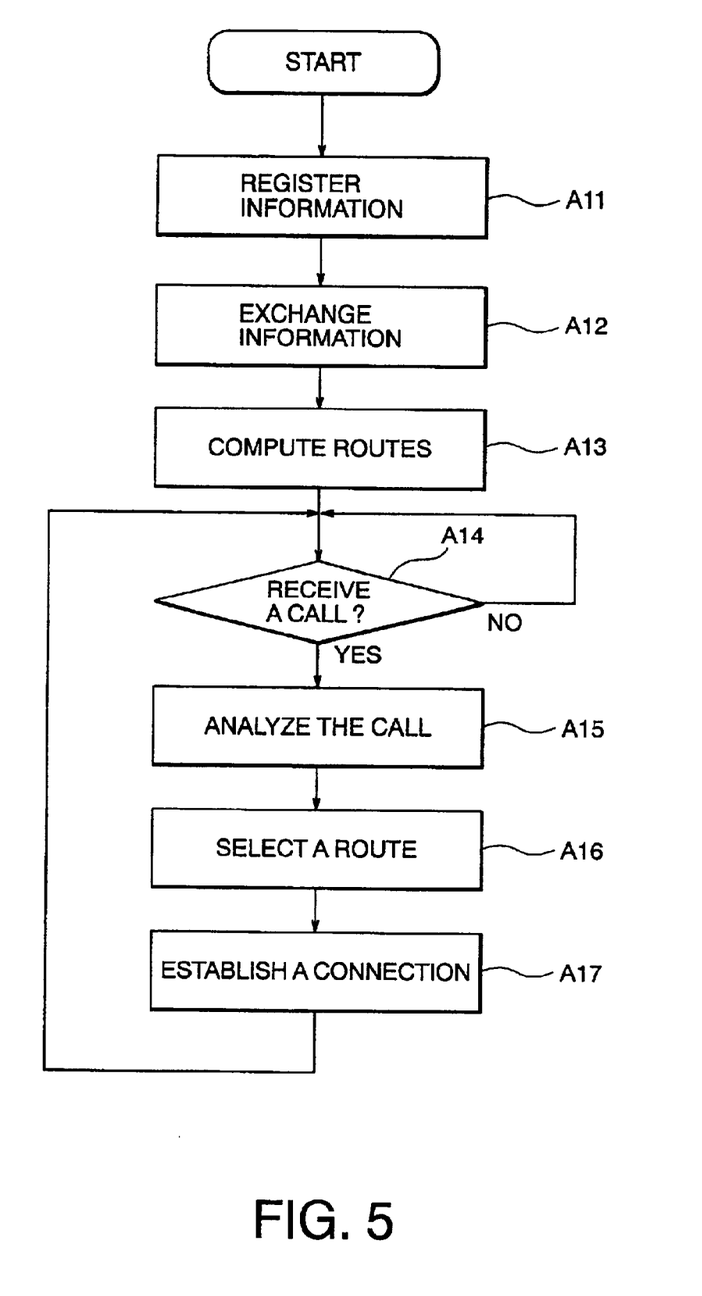
FIG. 5 shows a flowchart for describing operations of the PNNI routing computation system shown in FIG. 4.

Next, description is made about another embodiment of the invention with reference to FIGS. 4 and 5. Herein, the embodiment of the invention is applied to Soft PVC (Permanent Virtual Connection) and different routes can be selected for each connection. In Soft PVC, endpoints of connection are configured manually, but its route is generated automatically.

In this embodiment, each ATM exchange is constructed as shown in FIG. 4. That is, the illustrated ATM exchange further includes an SPVC call request process unit 50 as compared to the ATM exchange shown in FIG. 2. Also, the other parts shown in FIG. 4 are the same as the corresponding parts shown in FIG. 2 and are depicted by the same reference numerals as the corresponding parts shown in FIG. 2. Therefore, description will be omitted about the same parts.

Next, routing operations are described with reference to FIG. 5.

A subscriber of the ATM exchange sets weight values AW and CTD which are generally used for each link on PNNI routing, and the values are registered by a subscriber information input unit 10.

For example, in the ATM exchange A, weight values AW and CTD are each registered for links AB and AC which are connected to the ATM exchange A. Thus, as shown in FIG. 1, for the link AB, AW is 10 and CTD is 10, and for the link AC, AW is 100 and CTD is 10. Then, network subscribers Ax and Ay are registered to the ATM exchange A by using the subscriber information input unit 10 (step A11).

In the ATM exchanges B and C, the same operations are carried out. Next, a PNNI network information process unit 21 of the ATM exchange A informs the next ATM exchange via a data send/receive unit 30 that the weight values AW and CTD of the links AB and AC exist together with the existence of the network subscribers Ax and Ay. The other ATM exchanges (B and C) receive the information via an own data send/receive unit 30 and register the received information to a network information storage unit 41 of each ATM exchange (step A12).

Next, a routing computation unit 22 determines possible routes each of which is able to be connected to each ATM exchange by using network information stored in the network information storage unit 41, and computes total AW value or total CTD value for each route. Herein, considering about a route from the ATM exchange A to the ATM exchange C, two routes, namely, a route #3 (A→B→C) and a route #4 (A→C) can be determined. In the route #3, total CTD value is 20 and total AW value is 20. On the other hand, in the route #4, total CTD value is 10 and total AW value is 100. The information is then stored in the network information storage unit 41 (step A13).

When a Soft PVC connection is made between the subscribers Ax and Cx, the SPVC call request process unit 50 judges the subscriber Ax as a calling subscriber and judges the subscriber Cx as a receiving subscriber. Then, the SPVC call request process unit 50 sends a call request of Soft PVC by using the weight value AW for routing to the ATM exchange A. Thereafter, the data send/receive unit 30 of the ATM exchange A receives the call request (step A14).

Under the circumstances, the call process unit 23 of the exchange A analyzes the call request and detects that receiving exchange is the ATM exchange C and the weight value AW is used for routing (step A15).

Next, the call process unit 23 searches a routing computation result storage unit 43 for a route having the minimum total AW value and as a result, selects a route (A→B→C: total AW value is 20) (step A16). Then, the call process unit 23 performs the call request according to a normal PNNI call process based on the selected route (step A17).

As described above, according to the invention, a variety of routes can be selected by designating a type of weight values which are used for routing. This means that a connection route can be established according to various network subscriber's requirements.

Also, an ATM exchange applied to the method of the invention may be a computer including a CPU, a storage device, a memory, a storage medium reading device, and a network interface. Instructions causing the computer to perform the method of the invention may be stored in a storage medium such as a CD-ROM, a DVD-ROM, and a floppy disk. Each of the ATM exchange reads the instructions from the storage medium by using the storage medium reading device. Then the exchange stores the instructions into the memory and the CPU of the computer performs the method based on a series of the instructions.

Further, the program can be provided not using the storage medium. For example, from the Internet server or other computers through the Internet, the program data may be directly or indirectly sent to the ATM exchanges.

Description has been made about embodiments of PNNI routing computation at ATM exchanges, but the invention can be applied to a network adapting other packet exchange system (protocol).

Therefore, the system and the method of the invention may be applied to an IP network, in which routers decide path of each packet.

Furthermore, the use of the system and method according to the invention is not limited to PNNI on an ATM network. For example, NNI system on an ATM network and a packet exchange system on another network other than an ATM network can work based on the concept of the invention.

What is claimed is:

1. A PNNI routing computation system which is used in a PNNI network including a plurality of ATM exchanges connected to each other via links, and which performs PNNI routing computation on establishing a connection between subscribers, each ATM exchange comprising:
   a storage unit which stores plural types of weight values for each link;
   a computing unit which computes total weight value for each possible PNNI route between the subscribers by referring to one of the types of weight values selected by a calling subscriber; and
   a selecting unit which selects a route having the minimum total weight value among the possible PNNI routes as a result of the PNNI routing computation.

2. The PNNI routing computation system of claim 1, wherein the plural types of the weight values include a type of weight values based on administrative weight (AW) and a type of weight values based on cell transfer delay (CTD).

3. A PNNI routing computation system which is used in a PNNI network including a plurality of ATM exchanges connected each other via links, and which performs PNNI routing computation on establishing a connection between subscribers, each ATM exchange comprising:
   a storage unit which stores the plural types of weight values for each link;
   a computing unit which computes total weight value for each possible PNNI route between the subscribers by referring to one of the types of weight values selected by a calling subscriber; and
   a selecting unit which selects a route having the minimum total weight value among the possible PNNI routes as a result of the PNNI routing computation, wherein the types of the weight values include a type of weight values based on administrative weight (AW) and a type of weight values based on cell transfer delay (CTD).

4. A PNNI routing computation system which is used in a PNNI network including a plurality of ATM exchanges connected each other via links, and which performs PNNI routing computation on establishing a connection between subscribers, each ATM exchange comprising:
   a first storage unit which stores plural types of weight values for each link, the plural types of weight values being provided by a subscriber accommodated in the ATM exchange;
   a network information process unit which exchanges the plural types of weight values to the next ATM exchanges to obtain the plurality types of weight values for all links of the PNNI network and stores the weight values obtained from the next ATM exchanges into the first storage unit;
   a computing unit which computes total weight values for all possible PNNI routes from the ATM exchange to one of the other ATM exchanges by referring to the plural types of weight values stored in the first storage unit; and
   a second storage unit which stores the computed total weight values for each PNNI route.

5. The PNNI routing computation system of claim 4, wherein the first storage unit further includes a type of weight values used for routing computation and the type is provided by the subscriber accommodated in the ATM exchange, and wherein, each ATM exchange further comprises:
   a first call process unit which, when a subscriber accommodated in an ATM exchange including the first call process unit issues a call request, selects a PNNI route having the minimum total weight value from the second storage unit based on the type of weight values provided by the calling subscriber.

6. The PNNI routing computation system of claim 5, wherein the types of the weight values include a type of weight values based on administrative weight (AW) and a type of weight values based on cell transfer delay (CTD).

7. The PNNI routing computation system of claim 5, wherein each ATM exchange further comprises:
   a second call process unit which, when Soft PVC connection is produced between the subscribers, judges one subscriber as a calling subscriber and the other subscriber as a receiving subscriber, and sends a call request of Soft PVC to an ATM exchange accommodating the calling subscriber.

8. A PNNI routing computation system which is used in a PNNI network including a plurality of ATM exchanges connected to each other via links, and which performs PNNI routing computation on establishing a connection between subscribers, each ATM exchange comprising:
   a first storage unit which stores plural types of weight values for each link and a type of the weight values used for routing computation, the plural types of weight values and the type used for routing computation being provided by a subscriber accommodated in the ATM exchange;
   a network information process unit which exchanges the plural types of weight values to the next ATM exchanges to obtain the plural types of weight values for all links of the PNNI network and stores the weight values obtained from the next ATM exchanges into the first storage unit;

a computing unit which computes total weight value for all possible PNNI routes from the ATM exchange to one of the other ATM exchanges by referring to the plural types of weight values stored in the first storage unit;

a second storage unit which stores the computed total weight values for each PNNI route; and a first call process unit which, when a subscriber accommodated in an ATM exchange including the first call process unit issues a call request, selects a PNNI route having the minimum total weight value from the second storage unit based on the type of weight values provided by the calling subscriber.

9. The PNNI routing computation system of claim 8, wherein the types of the weight values include a type of weight values based on administrative weight (AW) and a type of weight value based on cell transfer delay (CTD).

10. The PNNI routing computation system of claim 8, wherein each ATM exchange further comprises:

a second call process unit which, when Soft PVC connection is produced between the subscribers, regards one subscriber as a calling subscriber and the other subscriber as a receiving subscriber, and sends a call request of Soft PVC to an ATM exchange accommodating the calling subscriber.

11. A method of a PNNI routing computation on establishing a connection between subscribers in ATM exchanges which are included in a PNNI network and are connected each other via links, the method comprising the steps of:

computing total weight value for each possible PNNI route between the subscribers by referring to one of types of weight values selected by a calling subscriber, each of the weight values corresponding to the link; and selecting a route having the minimum total weight value among the possible PNNI routes.

12. A method of a PNNI routing computation on establishing a connection between subscribers in ATM exchanges which are included in a PNNI network and are connected each other via links, the method comprising the steps of:

computing total weight value for each possible PNNI route between the subscribers by referring to one of types of weight values selected by a calling subscriber, each of the weight values corresponding to the link; and selecting a route having the minimum total weight value among the possible PNNI routes, wherein the types of the weight values include a type of weight values based on administrative weight (AW) and a type of weight values based on cell transfer delay (CTD).

13. A method of a PNNI routing computation on establishing a connection between subscribers in ATM exchanges which are included in a PNNI network and are connected each other via links, the method comprising the steps of:

exchanging plural types of weight values each of which corresponds to a link and which are provided in a subscriber accommodated in the ATM exchange, to the next ATM exchanges to obtain the plural types of weight values for all links of the PNNI network;

computing total weight values for all possible PNNI routes from the ATM exchange to one of the other ATM exchanges by referring to the obtained plural types of weight values; and storing the computed total weight values for each PNNI route.

14. A method of a PNNI routing computation on establishing a connection between subscribers in ATM exchanges which are included in a PNNI network and are connected each other via links, the method comprising the steps of:

exchanging plural types of weight values each of which corresponds to a link and which are provided in a subscriber accommodated in the ATM exchange, to the next ATM exchanges to obtain the plural types of weight values for all links of the PNNI network;

computing total weight values for all possible PNNI routes from the ATM exchange to one of the other ATM exchanges by referring to the obtained plural types of weight values;

storing the computed total weight values for each PNNI route; and selecting, when a subscriber accommodated in an ATM exchange issues a call request, a PNNI route having the minimum total weight value from the stored PNNI routes based on a type of weight values provided by the calling subscriber.

15. A recording medium readable by a computer, tangibly embodying a program of instructions executable by the computer to perform a method of a PNNI routing computation on establishing a connection between subscribers in ATM exchanges which are included in a PNNI network and are connected each other via links, the method comprising the steps of:

computing total weight value for each possible PNNI route between the subscribers by referring to one of types of weight values selected by a calling subscriber, each of the weight values corresponding to the link; and selecting a route having the minimum total weight value among the possible PNNI routes.

16. A computer data signal embodied in a carrier wave and representing a sequence of instructions which, when executed by a processor, cause the processor to perform a method of a PNNI routing computation on establishing a connection between subscribers in ATM exchanges which are included in a PNNI network and are connected each other via links, the method comprising the steps of:

computing total weight value for each possible PNNI route between the subscribers by referring to one of types of weight values selected by a calling subscriber, each of the weight values corresponding to the link; and selecting a route having the minimum total weight value among the possible PNNI routes.

17. A program product comprising, computer readable instructions and a recording medium bearing the computer readable instructions; the instructions being adaptable to enable a computer to perform a method of a PNNI routing computation on establishing a connection between subscribers in ATM exchanges which are included in a PNNI network and are connected each other via links, the method comprising the steps of:

computing total weight value for each possible PNNI route between the subscribers by referring to one of types of weight values selected by a calling subscriber, each of the weight values corresponding to the link; and selecting a route having the minimum total weight value among the possible PNNI routes.

18. A recording medium readable by a computer, tangibly embodying a program of instructions executable by the computer to perform a method of a PNNI routing computation on establishing a connection between subscribers in ATM exchanges which are included in a PNNI network and are connected each other via links, the method comprising the steps of:

exchanging plural types of weight values each of which corresponds to a link and which are provided in a subscriber accommodated in the ATM exchange, to the next ATM exchanges to obtain the plural types of weight values for all links of the PNNI network;

computing total weight values for all possible PNNI routes from the ATM exchange to one of the other ATM exchanges by referring to the obtained plural types of weight values; and storing the computed total weight values for each PNNI route.

19. A computer data signal embodied in a carrier wave and representing a sequence of instructions which, when executed by a processor, cause the processor to perform a method of a PNNI routing computation on establishing a connection between subscribers in ATM exchanges which are included in a PNNI network and are connected each other via links, the method comprising the steps of:

exchanging plural types of weight values each of which corresponds to a link and which are provided in a subscriber accommodated in the ATM exchange, to the next ATM exchanges to obtain the plural types of weight values for all links of the PNNI network;

computing total weight values for all possible PNNI routes from the ATM exchange to one of the other ATM exchanges by referring to the obtained plural types of weight values; and storing the computed total weight values for each PNNI route.

20. A program product comprising, computer readable instructions and a recording medium bearing the computer readable instructions; the instructions being adaptable to enable a computer to perform a method of a PNNI routing computation on establishing a connection between subscribers in ATM exchanges which are included in a PNNI network and are connected each other via links, the method comprising the steps of:

exchanging plural types of weight values each of which corresponds to a link and which are provided in a subscriber accommodated in the ATM exchange, to the next ATM exchanges to obtain the plural types of weight values for all links of the PNNI network;

computing total weight values for all possible PNNI routes from the ATM exchange to one of the other ATM exchanges by referring to the obtained plural types of weight values; and storing the computed total weight values for each PNNI route.

21. A routing computation system which is used in an IP network including a plurality of routing devices connected to each other via links, and which performs a routing computation on establishing a connection between subscribers, each routing device comprising:

a storage unit which stores plural types of weight values for each link;

a computing unit which computes total weight value for each possible route between the subscribers by referring to one of the types of weight values selected by a calling subscriber; and a selecting unit which selects a route having the minimum total weight value among the possible PNNI routes as a result of the routing computation.

22. A routing computation system which is used in an IP network including a plurality of routing devices connected each other via links, and which performs a routing computation on establishing a connection between subscribers, each routing device comprising:

a storage unit which stores the plural types of weight values for each link;

a computing unit which computes total weight value for each possible route between the subscribers by referring to one of the types of weight values selected by a calling subscriber; and a selecting unit which selects a route having the minimum total weight value among the possible PNNI routes as a result of the routing computation, wherein the types of the weight values include a type of weight values based on administrative weight (AW) and a type of weight values based on cell transfer delay (CTD).

23. A routing computation system which is used in an IP network including a plurality of routing devices connected each other via links, and which performs a routing computation on establishing a connection between subscribers, each routing device comprising:

a first storage unit which stores plural types of weight values for each link, the plural types of weight values being provided by a subscriber accommodated in the routing device;

a network information process unit which exchanges the plural types of weight values to the next routing devices to obtain the plurality types of weight values for all links of the IP network and stores the weight values obtained from the next routing devices into the first storage unit;

a computing unit which computes total weight values for all possible routes from the routing device to one of the other routing devices by referring to the plural types of weight values stored in the first storage unit; and a second storage unit which stores the computed total weight values for each route.

24. A routing computation system which is used in an IP network including a plurality of routing devices connected to each other via links, and which performs a routing computation on establishing a connection between subscribers, each routing device comprising:

a first storage unit which stores plural types of weight values for each link and a type of the weight values used for routing computation, the plural types of weight values and the type used for routing computation being provided by a subscriber accommodated in the routing device;

a network information process unit which exchanges the plural types of weight values to the next routing devices to obtain the plural types of weight values for all links of the IP network and stores the weight values obtained from the next routing devices into the first storage unit;

a computing unit which computes total weight value for all possible routes from the routing device to one of the other routing devices by referring to the plural types of weight values stored in the first storage unit;

a second storage unit which stores the computed total weight values for each route; and a first call process unit which, when a subscriber accommodated in a routing device including the first call process unit issues a call request, selects a route having the minimum total weight value from the second storage unit based on the type of weight values provided by the calling subscriber.

25. A method of an IP routing computation on establishing a connection between subscribers in routing devices which are included in an IP network and are connected each other via links, the method comprising the steps of:

computing total weight value for each possible route between the subscribers by referring to one of types of weight values selected by a calling subscriber, each of the weight values corresponding to the link; and selecting a route having the minimum total weight value among the possible routes.

26. A method of an IP routing computation on establishing a connection between subscribers in routing devices which are included in an IP network and are connected each other via links, the method comprising the steps of:

exchanging plural types of weight values each of which corresponds to a link and which are provided in a subscriber accommodated in the routing device, to the next routing devices to obtain the plural types of weight values for all links of the IP network;

computing total weight values for all possible routes from the routing device to one of the other routing devices by referring to the obtained plural types of weight values; and storing the computed total weight values for each route.

27. A computer data signal embodied in a carrier wave and representing a sequence of instructions which, when executed by a processor, cause the processor to perform a method of an IP routing computation on establishing a connection between subscribers in routing devices which are included in an IP network and are connected each other via links, the method comprising the steps of:

exchanging plural types of weight values each of which corresponds to a link and which are provided in a subscriber accommodated in the routing device, to the next routing devices to obtain the plural types of weight values for all links of the IP network;

computing total weight values for all possible routes from the routing device to one of the other routing device by referring to the obtained plural types of weight values; and storing the computed total weight values for each route.

28. A program product comprising, computer readable instructions and a recording medium bearing the computer readable instructions; the instructions being adaptable to enable a computer to perform a method of an IP routing computation on establishing a connection between subscribers in routing devices which are included in an IP network and are connected each other via links, the method comprising the steps of:

exchanging plural types of weight values each of which corresponds to a link and which are provided in a subscriber accommodated in the routing device, to the next routing devices to obtain the plural types of weight values for all links of the IP network;

computing total weight values for all possible routes from the routing device to one of the other routing devices by referring to the obtained plural types of weight values; and storing the computed total weight values for each route.

* * * * *